United States Patent

Mahabadi et al.

Patent Number: 4,774,160
Date of Patent: * Sep. 27, 1988

[54] TONER COMPOSITIONS WITH AMORPHOUS TERNARY COPOLYCARBONATES

[75] Inventors: Hadi-Khan Mahabadi, Mississauga; Lupu Alexandru, Toronto, both of Canada

[73] Assignee: Xerox Corporation, Stamford, Conn.

[ * ] Notice: The portion of the term of this patent subsequent of Sep. 24, 2002 has been disclaimed.

[21] Appl. No.: 18,268

[22] Filed: Feb. 24, 1987

[51] Int. Cl.⁴ .......... G03G 9/08; C08G 63/62
[52] U.S. Cl. .................. 430/106; 430/106.6; 430/109; 430/110; 528/196
[58] Field of Search .............. 430/109, 106; 528/196

[56] References Cited

U.S. PATENT DOCUMENTS 3,694,359  9/1972  Merrill et al. ............. 430/109
3,879,347  4/1975  Seairi et al. ................ 528/196 X
4,196,276  4/1980  Schreckerberg et al. ...... 528/196 X
4,318,974  3/1982  Pacansky et al. ............ 430/108
4,457,998  7/1984  Gruber et al. .............. 430/98
4,543,313  9/1985  Mahabadi et al. ........... 430/109

Primary Examiner—Roland E. Martin
Attorney, Agent, or Firm—E. O. Palazzo

[57] ABSTRACT

Disclosed is an improved toner composition comprised of pigment particles and amorphous ternary copolycarbonate resin particles of the formula

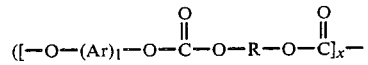
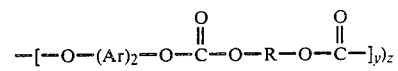

wherein R is an aliphatic hydrocarbon, n is a number of from about 4 to about 8, x is a number of from about 0.8 to about 0.95, y is a number of from about 0.05 to about 2, z represents the degree of polymerization, $Ar_1$ is an aromatic substituent, and $Ar_2$ is an aromatic substituent.

34 Claims, No Drawings

TONER COMPOSITIONS WITH AMORPHOUS TERNARY COPOLYCARBONATES

BACKGROUND OF THE INVENTION

This invention is generally directed to toner and developer compositions, and more specifically to toner compositions comprised of amorphous ternary copolycarbonates. In one embodiment of the present invention the toner composition, which is particularly useful in flash fusing and other noncontact fusing processes, is comprised of amorphous ternary copolycarbonates, pigment particles, and additive components, inclusive of charge enhancing additives thereby enabling the toner composition to acquire a positive, or negative triboelectric charging value. The aforementioned toner compositions when selected for incorporation into xerographic imaging apparatuses permit images of excellent resolution with no background deposits for an extended number of imaging cycles, subsequent to, for example, subjecting the developed image to noncontact fusing such as a flash fusing process, wherein there can be selected a xenon lamp providing a 1.1 microsecond pulse duration with a linearly varying pulse intensity along the surface being exposed. In addition, fused images of excellent resolution without odor or effluent and with a low fusing energy of, for example, about $0.85\pm0.05$ Joules/$cm^2$ can be obtained with the compositions of the present invention. Moreover, one of the main advantages associated with the aforementioned toner compositions resides in their thermal stability in the range of, for example, from about 250° C. to about 320° C. thereby avoiding the formation of odors, or undesirable effluents during flash fusing or radiation fusing.

The formation and development of images on the surface of photoreceptors, for example, by electrostatic means is well known, these processes involving subjecting the photoconductive material to a uniform charge; and subsequently exposing the surface thereof to a light image of the original to be reproduced. The latent image formed on the xerographic photoconductive surface is developed with toner particles specifically prepared for this purpose. Thereafter, the developed image can be transferred to a final support material such as paper, and affixed thereto to obtain a permanent record or copy of the original. Numerous methods are known for applying the electrostatic toner particles to the electrostatic latent image including, for example, cascade development, magnetic brush development, powder cloud development and touchdown development.

Thereafter, the developed image can be fixed by a number of various well known techniques including, for example, vapor fixing, heat fixing, pressure fixing, or combinations thereof, as described, for example, in U.S. Pat. No. 3,539,161. These techniques of fixing, while suitable for certain purposes, suffer from some deficiencies thereby rendering their use either impractical or difficult for specific electrostatographic applications. For example, it is difficult to construct an entirely satisfactory heat fuser which has high efficiency, can be easily controlled, and has a desirable short warm-up time. Also, heat fusers sometimes burn or scorch the support material. Somewhat similar problems including, for example, image offsetting and undesirable resolution degradation, are present with pressure fusing methods. Additionally, with these processes consistently desirable permanent images are not obtained. Further, although vapor fixing has advantages, one of its main disadvantages is that a toxic solvent is used, therefore, in many situations this method becomes commercially unattractive because of health hazards associated therewith. Also, equipment and apparatus to sufficiently isolate the fuser in vapor processes from the surrounding area are very complex, costly and difficult to operate.

Many of the modern electrostatographic reproducing apparatuses, which are capable of producing copies at an extremely rapid rate, created the need for the development of new materials and processing techniques. With these systems, radiant or flash fusing fixing processes can be selected wherein the energy which is emitted in the form of electromagnetic waves is immediately available and requires no intervening medium for its propagation. Although an extremely rapid transfer of energy between the source and the receiving body is provided with the flash fusing process, a problem encountered with this process resides in obtaining an apparatus which can fully and efficiently utilize a preponderance of the radiant energy emitted by the source during a relatively short flash. The toner image in these systems usually comprises a radiant energy causing most of the energy generated to be wasted as it is transmitted to the image, or is reflected away from the fusing areas. Furthermore, many of the toner compositions currently available, particularly colored toner compositions, contain pigments which do not absorb energy in the near infrared region of the spectrum thereby necessitating the supply of larger amounts of energy to these compositions to affect fusing. Moreover, many of the known colored toner compositions contain pigments therein which do not absorb energy in the near infrared and/or ultraviolet region of the spectrum, thus only about 33 percent of the spectral energy generated, for example, from presently used Xenon lamps is desirably absorbed by the colorants contained in the toner composition.

Specifically, for example, radiation energy emitted from a Xenon flash lamp or similar source is absorbed by the pigment or dye contained in the toner composition; and thereafter, this energy is converted to thermal energy by a radiationless decay process enabling heat generation causing the particles to fuse. The flash energy used is absorbed in a layer of toner of finite thickness adjoining the outer toner surface with absorption being greatest at the surface. This energy is also constantly decreasing with increasing distance from the outer toner surface. The flash generated is of very short duration, on the order of about one millisecond; and consequently, the toner regions very close to the surface are heated to a much higher temperature than the toner mass as a whole.

Additionally, it is known to incorporate into toner compositions various charge enhancing additives, such as alkyl pyridinium halides, reference U.S. Pat. No. 4,298,672, the disclosure of which is totally incorporated herein by reference; distearyl dimethyl ammonium methyl sulfates, reference U.S. Pat. No. 4,560,635; organic sulfonate and sulfates, reference U.S. Pat. No. 4,338,390, the disclosure of which is totally incorporated herein by reference; specific quaternary ammonium salts; and the like. Also, there is illustrated in U.S. Pat. No. 4,460,672, the disclosure of which is totally incorporated herein by reference, a developer composition mixture comprised of electrostatic toner particles consisting of resin particles, pigment particles, a waxy material with a molecular weight of from about 500 to about 20,000, and further included in the composition from about 0.5 percent by weight to about 10 percent by weight of a charge enhancing additive selected from, for example, alkyl pyridinium halides, organic sulfonate compositions, and organic sulfate compositions.

Furthermore, it is known to incorporate into toner compositions various resins such as addition polymers or polycondensation polymers which are thermally stable and do not produce odor or effluent during radiation or flash fusing process. It is also known that polycarbonate resins are thermally stable, however, their thermal and rheological properties render them undesirable in some instances for use in toner compositions. Therefore, a polycarbonate with the appropriate thermal and rheological properties is needed for incorporation into toner compositions.

There are also described in other patents toner compositions with wax components therein, reference for example U.S. Pat. No. 4,556,624, the disclosure of which is totally incorporated herein by reference. Specifically, the aforementioned patent illustrates an improved positively charged electrostatic toner composition comprised of a polyblend mixture of a crosslinked copolymer composition; and a second polymer, pigment particles, a wax component of a molecular weight of from about 500 to about 20,000, and a charge enhancing additive. Other patents of interest include U.S. Pat. No. 3,079,342, relating to toners comprised of polystyrene and polymeric modifiers incorporated therein such as long chain thermoplastic plasticizers; U.S. Pat. No. 4,329,415, relating to magnetic developer compositions with waxes therein such as vegetable waxes, whale wax and synthetic waxes including polyethylene wax, and polypropylene wax; U.S. Pat. No. 4,362,803, describing one component magnetic developers with low molecular weight polyethylene and polypropylene; and U.S. Pat. No. 4,385,107, disclosing toner compositions comprised of specific graft copolymers inclusive of polyethylene and polyproplyene.

In addition, there are illustrated in U.S. Pat. No. 4,543,313 toner compositions comprised of resin particles selected from the group consisting of thermotropic liquid crystalline polycarbonates, copolycarbonates, polyurethanes, polyesters, and copolyesters; and pigment particles. However, these particles are not amorphous, for example, and possess two or more thermal transitions as compared to the amorphous ternary copolycarbonates of the present invention with only a single thermal transition temperature of from about 50° C. to about 55° C. Furthermore, in U.S. Pat. No. 4,318,974 there is disclosed an improved toner composition comprised of a colorant and a copolycarbonate resin wherein the resulting toner has certain characteristics, reference the Abstract of the Disclosure, and note the disclosure in column 3, beginning at line 51. Furthermore, other patents that are primarily of background interest include U.S. Pat. Nos. 3,694,359; 4,288,516; 4,352,877; 4,457,998; 4,555,468 and 4,575,478.

Nevertheless, there remains a need for toner and developer compositions particularly useful in electrostatographic imaging systems having incorporated therein flash fusing devices. Also, there is a need for resins with low melt viscosities of, for example, from about 100 to about 300 poise at 150° C. and specific glass transition temperatures, for example above 50° C., or in excess of the blocking temperature of the specific toner composition selected. Furthermore, there is a need for thermally stable resins which withstand temperatures as high as 320° C. without generating effluents or odors. Also, there is a need for positively charged toner compositions containing therein in addition to the ternary copolycarbonates illustrated herein pigment particles, and charge enhancing additive components. Moreover, there is a need for thermally stable toner compositions with acceptable triboelectric charging properties, which compositions are especially useful in electrostatographic imaging devices containing therein flash fusing components, such as xenon lamps. Another need of the present invention resides in the provision of processes wherein the developed image formulated is permanently affixed to a suitable substrate by a flash fusing process emitting energy in an amount of from about 4 to about 8 joules/inches squared. There also remains a need for toner compositions that are thermally stable up to temperatures of 350° C. without generating odor or effluent during the fusing process.

SUMMARY OF THE INVENTION

It is an object of the present invention to provide toner compositions especially useful in electrostatographic imaging devices with flash fusing components therein.

In a further object of the present invention there are provided amorphous ternary copolycarbonate resins that can be formulated into toner compositions useful in flash fusing processes.

Another objects of the present invention resides in toner compositions comprised of certain amorphous ternary copolycarbonates that possess numerous desirable properties, inclusive of exceptional thermal stabilities at high temperature.

Also, in a further object of the present invention, there are provided toner compositions containing therein amorphous ternary copolycarbonates, pigment particles, and additive particles.

Moreover, in a further object of the present invention, there are provided toner compositions containing therein amorphous ternary copolycarbonates, pigment particles, inclusive of carbon blacks, and magnetites; and charge enhancing additives.

In yet another object of the present invention there are provided thermally stable toner compositions with acceptable triboelectric charging characteristics, wherein the ternary copolycarbonates possess controlled rigidity of the macromolecule backbones thereby enabling the glass transition temperature thereof, for example, to be in excess of 50° C.

Additionally, in a further object of the present invention there are provided imaging and printing processes wherein subsequent to development with the compositions of the present invention the images formulated are permanently affixed to a suitable substrate by a radiation or a flash fusing process.

Moreover, in a further objective of the present invention, there are provided toner compositions that avoid the formation of odors or effluent during radiant or flash fusing processes.

Another objective of the present invention resides in toner compositions with low fusing energies of from, for example, about 0.7 to about 0.9 joules/cm$^2$.

In yet another object of the present invention there are provided toner compositions which upon fusing result in an optical density de-enhancement of less than 20 percent.

These and other objects of the present invention are obtained by the provision of toner compositions containing therein novel amorphous ternary copolycarbonates. More specifically, in one embodiment of the present invention there are provided toner compositions comprised of specific amorphous ternary copolycarbonates, pigment particles, and optional charge enhancing additive components. Moreover, in another important embodiment of the present invention there are provided toner compositions comprised of from about 74 percent by weight to about 91 percent by weight of certain amorphous ternary copolycarbonates as illustrated hereinafter, from about 8 percent to about 20 percent by weight of pigment particles, and from about 0.5 percent to about 1.5 percent by weight of a charge enhancing additive. Also, in accordance with the present invention developer compositions can be formulated by admixing the aforementioned toner compositions with carrier components.

There are also provided in accordance with the present invention imaging and printing processes which comprises (1) providing a toner composition containing therein amorphous ternary copolycarbonates, pigment particles, and charge enhancing additives; (2) incorporating the resulting toner composition into an electrostatographic imaging apparatus with a flash fusing, or radiant device therein; (3) forming an electrostatic latent image therein and subsequently developing this image with said toner composition; (4) transferring the developed image to a supporting substrate; and (5) permanently affixing the image thereto with a flash fusing device generating an energy of, for example, from about 4 to 8 joules/inch$^2$.

The amorphous ternary copolycarbonates selected for the toner compositions of the present invention are of the following formula:

$$([-O-(Ar)_1-O-\overset{O}{\underset{\|}{C}}-O-R-O-\overset{O}{\underset{\|}{C}}]_x-$$

$$-[-O-(Ar)_2-O-\overset{O}{\underset{\|}{C}}-O-R-O-\overset{O}{\underset{\|}{C}}-]_y)_z$$

wherein R is an aliphatic hydrocarbon such as, for example, those with from about 1 to about 25 carbon atoms, inclusive of those of the formula $(CH_2)_n$ and $(CH_2)_2-O-(CH_2)_2-$, wherein n is a number of from about 4 to about 8; x and y are numbers that will enable ternary copolycarbonates, for example, x is a number of from about 0.8 to about 0.95, and y is a number of from about 0.05 to about 0.2; z represents the degree of polymerization, and can be a number of from about 2 to about 30 which translates to number average molecular weight of from about 1,200 to about 3,500 as measured by GPC (Gel Permeation Chromotography); $Ar_1$ is an aromatic substituent such as those selected from the group consisting of

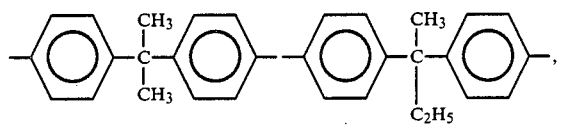

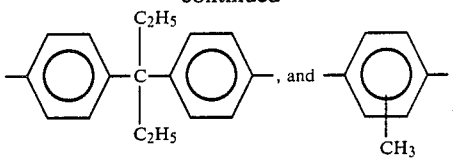

and $Ar_2$ is an aromatic substituent such as those selected from the group consisting of

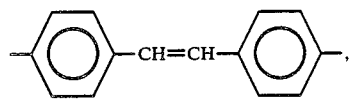

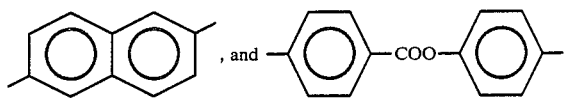

The aforementioned amorphous ternary copolycarbonates are amorphous with a single thermal transition of, for example, from about 50° C. to about 55° C. as measured by DSC as compared to thermal liquid crystalline polymers of the U.S. Pat. No. 4,543,313, the disclosure of which is totally incorporated herein by reference, which are not amorphous and have two or more thermal transition temperatures.

Various suitable colorants and/or pigment particles may be incorporated into the toner and developer composition of the present invention including, for example, carbon black, nigrosine dye, magnetic particles, such as Mapico Black, a mixture of iron oxides, and the like. The pigment particles are present in the toner in sufficient quantities to render it highly colored thereby enabling the formation of a visible image on a recording member. Thus, for example, the pigment particles with the exception of magnetic materials should be present in the toner composition in an amount of from about 2 percent by weight to about 15 percent by weight, and preferably from about 2 percent by weight to about 10 percent by weight. With regard to magnetic pigments such as Mapico Black, they are generally incorporated into the toner composition in an amount of from about 10 percent by weight to about 70 percent by weight, and preferably in an amount of from about 20 percent by weight to about 50 percent by weight.

While the magnetic particles can be present in the toner composition as the only pigment, these particles may be combined with other pigments such as carbon black. Thus, for example, in this embodiment of the present invention, the other pigments are present in an amount of from about 10 percent by weight to about 15 percent by weight, mixed with from about 10 to about 60 percent by weight of magnetic pigment. Other percentage combinations may be selected providing the objectives of the present invention are achieved.

As charge enhancing additives, which are present in the toner compositions in effective amounts, such as from about 0.1 percent by weight to about 20 percent by weight, and preferably from about 3 percent by weight to about 10 percent by weight, there can be selected various known compositions inclusive of alkyl pyridinium halides, particularly cetyl pyridinium chloride, reference U.S. Pat. No. 4,298,672, the disclosure of which is totally incorporated herein by reference; organic sulfonates, and organic sulfates, such as stearyl phenethyl dimethyl ammonium tosylate, reference U.S. Pat. No. 4,338,390, the disclosure of which is totally incorporated herein by reference; dimethyl distearyl ammonium methyl sulfate, reference U.S. Pat. No. 4,560,635, the disclosure of which is totally incorporated herein by reference; and the like.

Additionally, the toner compositions of the present invention can be admixed with carrier components in formulating the developer composition selected for incorporation into an electrostatogrpahic imaging apparatus. As carrier particles, there can be selected well known components including steel, iron ferrites, sponge iron, and the like. Generally, the carrier particles include a coating thereover such as terpolymers of a polymerized styrene, polymerized acrylate or methacrylate, and a polymerizable organo silicon composition, reference U.S. Pat. Nos. 3,526,533 and 3,467,634, the disclosures of which are totally incorporated herein by reference. Other coatings that can be selected include known fluoropolymers such as polyvinylidene fluoride, commercially available from the E. I. DuPont Company. Generally, the carrier component is mixed with the toner composition in effective suitable combinations; however, best results are obtained when from about 1 part by weight of toner particles to about 100 to about 1,000 parts by weight of carrier particles are selected. Preferred are developer compositions wherein the toner concentration ranges from about 1 percent to about 10 percent.

Second optional additive components that may be blended with the toner resin particles include colloidal silicas, reference U.S. Pat. Nos. 3,720,617 and 3,900,588, the disclosures of which are totally incorporated herein by reference. Generally, the colloidal silica, which functions primarily as a powder flow additive, is present in an amount of from about 0.1 percent to about 1 percent. Furthermore, there can be selected as additives metal salts and metal salts of fatty acids, inclusive of zinc stearate, reference U.S. Pat. Nos. 3,590,000 and 3,983,045, the disclosures of which are totally incorporated herein by reference. The aforementioned additives are generally present in an amount of from about 0.1 percent by weight to about 10 percent by weight.

Photoconductive members that can be selected for generating the electrostatic latent image for development include amorphous selenium; selenium alloys, such as selenium arsenic, selenium antimony, selenium tellurium, selenium tellurium arsenic; halogen doped selenium substances; halogen doped selenium alloys, wherein for example the dopant is preferably present in an amount of from about 20 parts per million to about 100 parts per million; and hydrogenated amorphous silicon. Dopants that are selected are well known and include chlorine and bromine. There can also be preferably selected as photoconductive members those as illustrated in U.S. Pat. Nos. 4,265,990, the disclosure of which are totally incorporated herein by reference, which members contains therein photogenerating and charge transport layers, which members can be charged negatively. Examples of photogenerating materials are metal phthalocyanines, metal free phthalocyanines, vanadyl phthalocyanines, and the like, which components may be optionally dispersed in inactive resinous compositions.

With further respect to the ternary copolycarbonates, they can be prepared by the low temperature solution polycondensation of a (1) mixture of from about 70 to about 90 mole percent of two dihydroxy aromatic compounds with about 80 to 95 percent of an aliphatic substituted aromatic compound, and from about 5 to about 20 percent rigid aromatic compound; and (2) an aliphatic bischloroformate. The composition of the two dihydroxy aromatics is selected to enable an amorphous ternary copolycarbonate with a single thermal transition temperature as illustrated herein.

Thus, for example, the amorphous ternary polycarbonate resins can be prepared by the solution polycondensation of p,p'-biphenol, bisphenol A and an aliphatic bischloroformate by heating at a temperature of from about 10° C. to about 30° C. These processes are affected in the presence of an acid acceptor, such as triethylamine, and an organic solvent, such as methylene chloride, and other similar halogenated aliphatic hydrocarbons. More specifically, the ternary copolycarbonates are prepared by reacting from about 0.05 to about 0.25 moles of p,p'-biphenol and from about 0.95 to about 0.75 moles of bisphenol A with from about 0.7 to about 1.2 moles of an aliphatic bischloroformate at room temperature in the presence of about 10 to 15 grams of an acid acceptor such as triethylamine, pyridine and the like, and organic solvents such as methylene chloride. Thereafter, the resulting product is separated from the reaction mixture by known techniques, optionally washed, and identified by various analytical tools including elementary analysis, NMR, IR and UV. Other specific amorphous ternary copolycarbonates can be prepared in a similar manner, including more specifically, these polymers are interfacial or melt polycondensations enabling polymers with intrinsic viscosities of from about 0.05 to about 0.2 deciliter per gram.

The synthesis of a specific ternary copolycarbonate is illustrated with reference to the following equations:

$$HO-(Ar)_1-OH + HO-(Ar)_2-OH + Cl-\overset{O}{\underset{\|}{C}}-O-R-O-\overset{O}{\underset{\|}{C}}-Cl \xrightarrow[15° C.]{Pyridine/CH_2Cl_2}$$

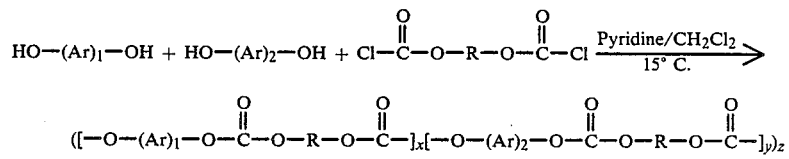

$$([-O-(Ar)_1-O-\overset{O}{\underset{\|}{C}}-O-R-O-\overset{O}{\underset{\|}{C}}-]_x[-O-(Ar)_2-O-\overset{O}{\underset{\|}{C}}-O-R-O-\overset{O}{\underset{\|}{C}}-]_y)_z$$

wherein R is an aliphatic hydrocarbon, $(Ar)_1$ and $(Ar)_2$ are aromatic substitutents, x is a number of from about 0.8 to about 0.95, and y is a number of from about 0.05 to about 0.2, and z is the degree of polymerization which is from about 2 to about 30. The ternary copolycarbonates of the present invention are amorphous, and thus are very useful for low melting and thermally stable toners, which soften at 90° C. with a melt viscosity at 150° C. of about 100 to about 150 poise; and which are thermally stable up to 320° C. as determined, for example, by a thermal gravometric analysis (TGA). Moreover, although the aforementioned amorphous polymers have low melt viscosity at normal fusing temperature, the level of odor and effluents are not detectable by GC(Gas Chromotography).

Examples of known flash fusing systems that may be selected for the present invention include those as described in U.S. Pat. Nos. 3,529,125; 3,903,394; and 3,474,223, the disclosure of each of these patents being totally incorporated herein by reference. Generally, the flash fuser selected contains a Xenon lamp, the output of the lamp being primarily in the visible and near infrared wavelengths of the regions. The output of the flash lamp is measured by Joules using the capacitor bank energy in accordance with the formula $\frac{1}{2} CV^2$ wherein C is capacitance and V is the voltage. One of the main advantages of such a flash fuser over other known methods of fusing is, as indicated herein, that the energy propagated in the form of electromagnetic waves is immediately available, and no intervening source is needed. Also, such flash fusing systems do not require long warm-up periods, and the energy does not have to be transferred through a relatively low conductive or corrective heat transfer mechanism.

The following examples are being supplied to further decline specific embodiments of the present invention, it being noted that these examples are intended to illustrate and not limit the scope of the present invention. Parts and percentages are by weight unless otherwise indicated.

EXAMPLE I

There was charged in a 250 milliliter, four-necked round bottom flask equipped with a mechanical stirrer, a nitrogen inlet and outlet, a thermometer, and a liquid dropping funnel, 11 grams, 0.048 mole of bisphenol A, 2.4 grams, 0.013 moles of p-p'-biphenol, 12.2 grams pyridine and 100 milliliters of methylene chloride. The flask was placed in cooled water, and mechanical agitation of the contents was accomplished for 15 minutes. When the internal temperature of the flask decreased to 15° C., the dropping funnel was filled with 12.9 grams, 0.056 mole of diethylene glycol bischloroformate, which was added to the reaction mixture in 0.5 hour. Thereafter, the reaction mixture was stirred for an additional 3 hours while maintaining the temperature at 20° C. to 25° C.

After cooling to room temperature, the resulting amorphous polymer was separated from the reaction mixture by filtration, and subsequently the product obtained was washed, first with 100 milliliters of hydrochloric acid, and then 3 times with 100 milliliters of deionized water. Thereafter, the polymer solution was separated and the polymer product was precipitated in hexane, following by drying in a vacuum oven at 40° C.

There was obtained as evidenced by elemental analysis and infrared spectroscopy the product bisphenol A biphenol-diethylene glycol copolycarbonate in a yield of 99 percent and with a number average molecular weight of from about 1,600 to about 3,000 as measured by GPC. Thereafter, this product was characterized with DSC, TMA (Thermal Mechanical Analysis), TGA (Thermal Gravometric Analysis), and Rheometric Mechanical Spectrometer analysis.

The DSC thermograms of the product polymer indicate a single glass transition of from 50° to 52° C. These results indicate that the polymer was amorphous and not a thermotropic liquid crystalline polymer. Also, the TMA thermograms of the product polymer indicate a softening temperature of from about 74° C. to about 78° C. Moreover, the TGA results indicate that polymer product was thermally stable up to 320° C. Rheological properties as determined with the Rheometric Mechanical Spectrometer evidenced that the melt viscosity of the ternary copolycarbonate product prepared in accordance with the procedure of this example was from about 100 to 370 poise at 140° C.

There was then formulated by extrusion processing a negative charging toner with 20 percent by weight of Mapico Black based on the weight of the toner composition and 80 percent by weight of the above prepared amorphous diethylene copolycarbonate. Extrusion and micronization of this composition was affected without any difficulties. Thereafter, the black colored toner particles with an average particle diameter of about 11 microns were mixed with a carrier consisting of a ferrite core coated with a terpolymer of styrene, methylmethacrylate, and vinyl triethoxy silane. About 3 parts of the toner composition were mixed with 100 parts of carrier. The toner composition had a triboelectric charge thereon, as determined in a Faraday Cage apparatus, of about $-7$ to about $-16$ microcoulombs per gram. Thereafter, the mixture was cascaded across a selenium photoconductive surface containing thereon an electrostatic latent image, and the toner deposited on the selenium surface in image configuration. The image was then electrostatically transferred to a paper receiving sheet, and this sheet was then pulsed under a Xenon flash lamp generating 1.1 microsecond light pulses. More specifically, there was selected for fusing an inclined Xenon flash tube apparatus which yields an energy distribution as a function of position in the range of 0.4 to 1.5 joules/cm$^2$. The image which consisted of a line of rectangles 1 millimeter wide and 3 millimeters high was flash fused. Subsequently, a scotch tape was applied on the fused image with a gentle finger pressure, and the tape was then slowly peeled off at an angle of 180 degrees. The image optical densities, after fusing and subsequent to the scotch tape test, were measured by a microdensitometer. In order to determine the fusing energy, optical density changes before and after the scotch tape test were compared. Fusing energy is then defined as the energy at which image optical density changed by 0.1 before and after the scotch tape test. The optical density de-enhancement was obtained by comparing the optical density before and after fusing.

These measurements indicated that the toner composition with the bisphenol A biphenol diethylene glycol polycarbonate was thermally stable, and that no odor or effluent was detected at very high energy levels; and wherein the density de-enhancement was less that 0.1, the fusing energy was 0.75 joules/cm$^2$; and there was generated subsequent to fusing a matte image without any background deposits.

EXAMPLE II

There was prepared a toner and developer composition by repeating the procedure of Example I with the exception that there was selected as the pigment Revon 5750 carbon black. The toner composition, which contained 8 percent of Revon 5750 and 92 percent of the amorphous ternary copolycarbonate polymer, was subjected to the same tests as Example I, and subsequent to the flash fusing evaluation substantially similar results were obtained.

EXAMPLE III

There was prepared a toner and developer composition by repeating the procedure of Example I with the exception that there was selected 6 percent Regal ® 330 carbon black, and 1.5 percent of the charge additive stearyl phenethyl dimethyl ammonium tosylate, and 92.5 percent of the ternary copolycarbonate. The resulting toner and a fusing energy of 0.85 joules/cm$^2$ with an average triboelectric charge therein of about 40 μc/gm as determined by the Faraday Cage process was evaluated for flash fusing by repeating the procedure of Example I with substantially similar results.

EXAMPLE IV

There was charged into a 250 milliliter, four-necked round bottom flask equipped with a mechanical stirrer, a nitrogen inlet and outlet, a thermometer, and a liquid dropping funnel, 11.0 grams, 0.048 moles of bisphenol A, 2.4 grams, 0.013 mole of p,p' biphenol, 12.2 grams pyridine, and 100 milliliters of methylene chloride. The flask was placed in cooled water, and mechanical agitation of the contents was accomplished for 15 minutes. When the internal temperature of the flask decreased to 15° C., the dropping funnel was filled with 0.056 mole to about 0.06 mole of butanediol bischloroformate, which was added to the reaction mixture in 0.5 hour. Thereafter, the reaction mixture was stirred for an additional 3 hours while maintaining the temperature at 20° C. to 25° C.

After cooling to room temperature, the resulting polymer solution was separated from the reaction mixture by filtration, and subsequently the product obtained was washed first with 100 milliliters of hydrochloric acid, and then 3 times with 100 milliliters of deionized water. Thereafter, the polymer solution was separated and the amorphous ternary copolycarbonate polymer product was precipitated in hexane followed by drying in a vacuum oven at 40° C.

There was obtained as evidenced by elemental analysis, and infrared spectroscopy, the product bisphenol A biphenol-butane diol copolycarbonate with number average molecular weight of from about 1,800 to about 3,000 in a yield of about 99 percent. Thereafter, this product was characterized with DSC, TMA, TGA and Rheometric Mechanical Spectrometer analysis. The DSC thermograms of this polymer indicate a single glass transition of from about 49° C. to 54° C. The TMA thermograms of this polymer indicate a softening temperature of from 73° C. to about 79° C. Moreover, the TGA results indicate that this polymer was thermally stable up to 320° C. Rheometric Mechanical Spectrometer evidenced that the melt viscosity of the amorphous ternary copolycarbonate prepared in accordance with the procedure of this example is from about 120 to about 300 poise at 140° C.

Other ternary copolycarbonate can be prepared in a similar manner by substituting for the bisphenol A and p,p' biphenol various dihydroxy aromatic compounds. There thus can be obtained amorphous products of the following formula:

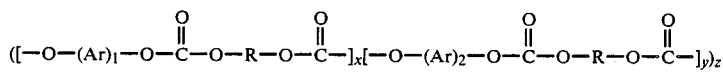

wherein the substituents are as defined herein.

EXAMPLE V

There was prepared a toner composition with the amorphous ternary copolycarbonate as obtained in Example IV. The toner composition was comprised of 8 percent Ravon 5750 carbon black and 92 percent by weight of ternary polymer. Subsequent to the flash fusing evaluations as detailed in Example I substantially similar imaging results were obtained.

EXAMPLE VI

There are prepared a toner composition with 92.5 percent of the ternary copolycarbonate as obtained in Example IV, 6 percent Regal ® 330 carbon black, and 1.5 percent by weight of the charge enhancing additive stearyl phenethyl dimethyl ammonium tosylate by repeating the procedure of Example I, and substantially similar fusing and imaging results were obtained.

Other modifications of the present invention will occur to those skilled in the art based upon a reading of the present disclosure. These are intended to be included within the scope of this invention.

What is claimed is:

1. An improved toner composition comprised of pigment particles and amorphous ternary copolycarbonate resin particles of the formula

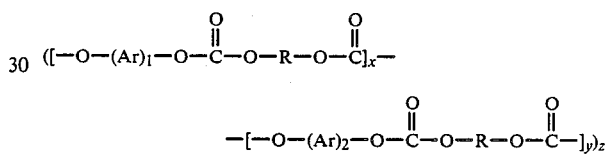

wherein R is an aliphatic hydrocarbon, x is a number of from about 0.8 to about 0.95, y is a number of from about 0.05 to about 2, z represents the degree of polymerization, $Ar_1$ is an aromatic substituent, and $Ar_2$ is an aromatic substituent.

2. A toner composition in accordance with claim 1 wherein R is an aliphatic hydrocarbon with from about 1 to about 25 carbon atoms.

3. A toner composition in accordance with claim 1 wherein R is an aliphatic hydrocarbon of the formula $(CH_2)_n$ wherein n is a number of from about 4 to about 8.

4. A toner composition in accordance with claim 1 wherein R is $(CH_2)_2$—O—$(CH_2)_2$.

5. A toner composition in accordance with claim 1 wherein $Ar_1$ is selected from the group consisting of

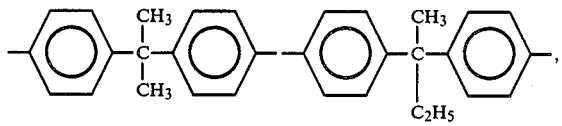

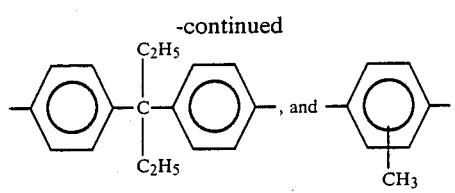

6. A toner composition in accordance with claim 1 wherein Ar₂ is selected from the group consisting of

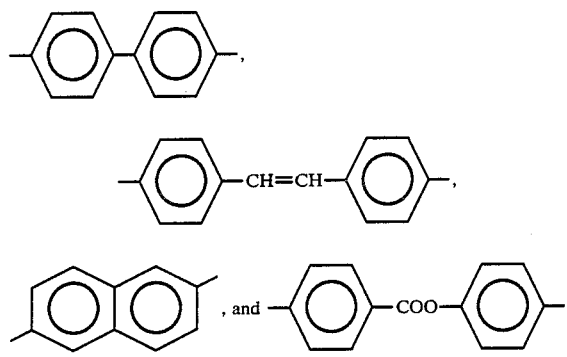

7. A toner composition in accordance with claim 1 wherein the ternary copolycarbonate has a single thermal transition of from about 50° C. to about 55° C.

8. A toner composition in accordance with claim 1 wherein the ternary copolycarbonate results from the condensation reaction of p, p'-biphenol, bisphenol A and aliphatic bischloroformates.

9. A toner composition in accordance with claim 1 wherein the number average molecular weight of the ternary copolycarbonate is from about 1,200 to about 3,500.

10. A toner composition in accordance with claim 1 wherein the pigment particles are carbon black.

11. A toner composition in accordance with claim 1 wherein the pigment particles are magnetite.

12. A toner composition in accordance with claim 1 further including therein charge enhancing additive components.

13. A toner composition in accordance with claim 12 wherein the charge enhancing component is an alkyl pyridinium halide, an organic sulfate, an organic sulfonate, or distearyl dimethyl ammonium methyl sulfate.

14. A toner composition in accordance with claim 8 wherein the amorphous ternary copolycarbonate has a single thermal transition temperature of from about 50° C. to about 55° C.

15. A developer composition comprised of the toner composition of claim 1, and carrier components.

16. A developer composition in accordance with claim 15 wherein the carrier particles are comprised of a core with a coating thereover.

17. A developer composition in accordance with claim 16 wherein the core is selected from the group consisting of steel and ferrite.

18. A developer composition in accordance with claim 15 wherein the coating is a polymeric composition.

19. A developer composition in accordance with claim 15 wherein the ternary copolycarbonate has a single thermal transition temperature of from about 50° C. to about 55° C.

20. A developer composition in accordance with claim 16 wherein the amorphous ternary copolycarbonate has a single thermal transition temperature of from about 50° C. to about 55° C.

21. A method for affecting development of electrostatic latent images which comprises the generation of a latent image on a photoresponsive imaging member, subsequently developing this image with the toner composition of claim 1, thereafter transferring the image to a suitable substrate, and permanently affixing the image thereto.

22. A method of imaging in accordance with claim 21 wherein there is selected for fixing the image a flash fusing process.

23. A method of imaging in accordance with claim 22 wherein subsequent to flash fusing no effluent or odor is detected.

24. An amorphous ternary copolycarbonate resin of the formula

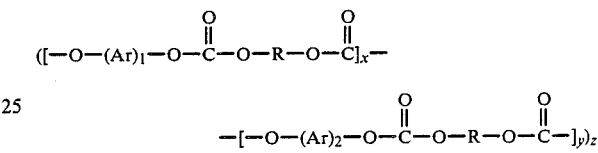

wherein R is an aliphatic hydrocarbon, x is a number of from about 0.8 to about 0.95, y is a number of from about 0.05 to about 2, z represents the degree of polymerization, Ar₁ is an aromatic substituent, and Ar₂ is an aromatic substituent.

25. A copolycarbonate resin in accordance with claim 24 wherein R is a aliphatic hydrocarbon with from about 1 to about 25 carbon atoms.

26. A copolycarbonate resin in accordance with claim 24 wherein R is an aliphatic hydrocarbon of the formula $(CH_2)_n$ wherein n is a number of from about 4 to about 8.

27. A copolycarbonate resin in accordance with claim 24 wherein R is $(CH_2)_2-O-(CH_2)_2$.

28. A copolycarbonate resin in accordance with claim 24 wherein Ar₁ is selected from the group consisting of

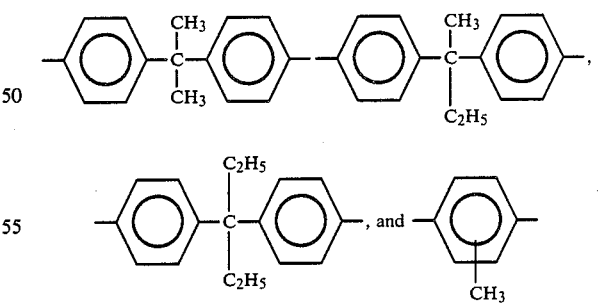

29. A copolycarbonate resin in accordance with claim 24 wherein Ar₂ is selected from the group consisting of

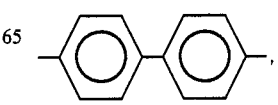

-continued

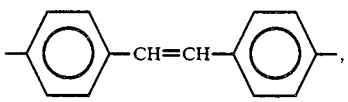

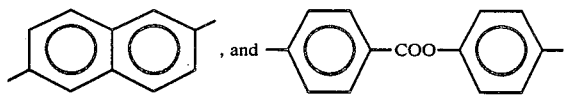

30. A copolycarbonate resin in accordance with claim 24 wherein the ternary copolycarbonate has a single thermal transition of from about 50° C. to about 55° C.

31. A copolycarbonate resin in accordance with claim 24 wherein the ternary copolycarbonate results from the condensation reaction of p,p'-biphenol, bisphenol A and aliphatic bischloroformates.

32. A copolycarbonate resin in accordance with claim 24 wherein the number average molecular weight of the ternary copolycarbonate is from about 1,200 to about 3,500.

33. A toner composition in accordance with claim 1 wherein z is a number of from about 2 to about 30.

34. A ternary copolycarbonate resin in accordance with claim 24 wherein z is a number of from about 2 to about 30.

* * * * *